(No Model.) 2 Sheets—Sheet 2.

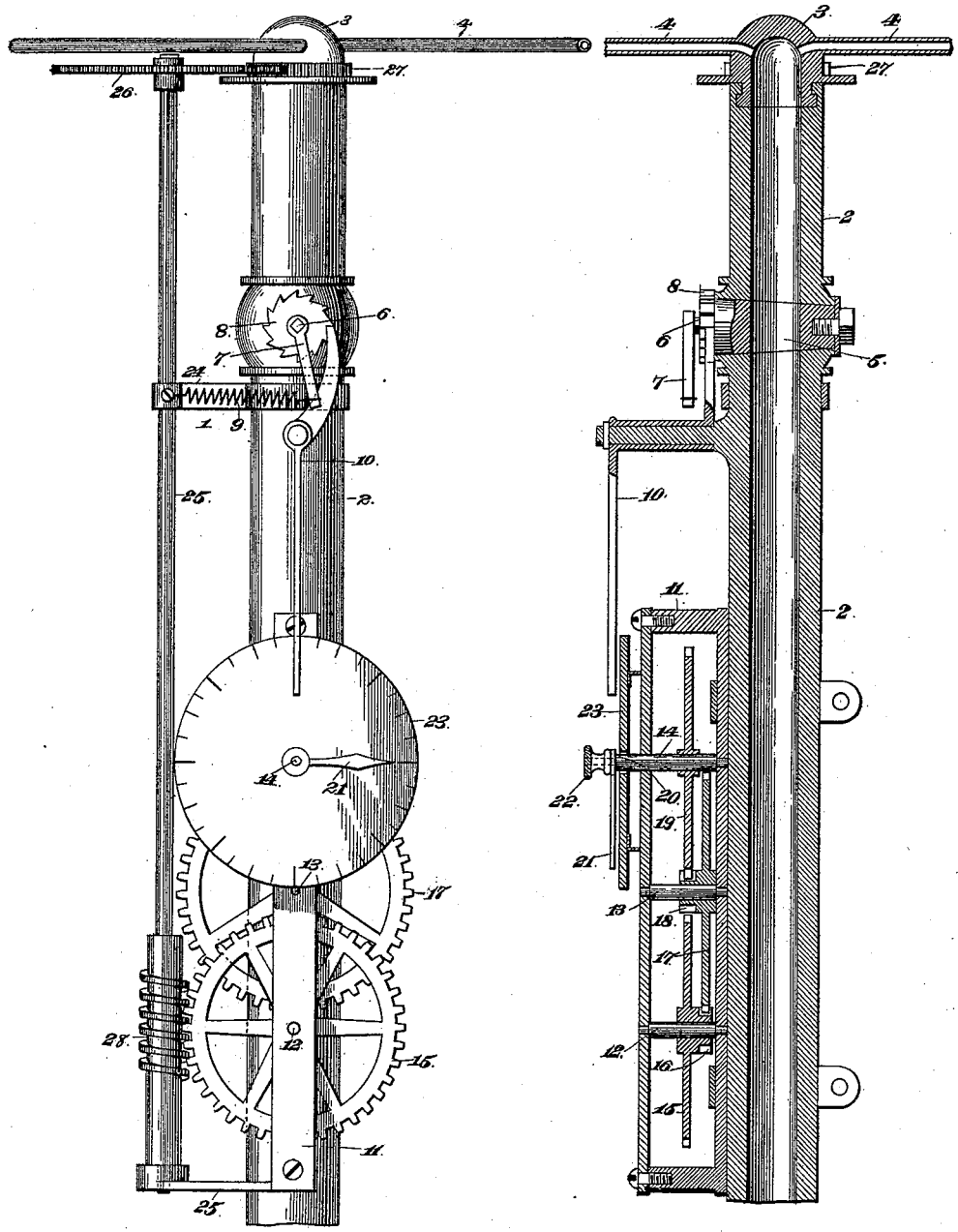

R. S. MOORE.
LAWN SPRINKLER.

No. 464,637. Patented Dec. 8, 1891.

Witnesses
M. Fowler
Wm. Bagger

Inventor
Robert S. Moore
By his Attorneys,
C. A. Snow & Co.

UNITED STATES PATENT OFFICE.

ROBERT SERVETUS MOORE, OF BRADSHAW, NEBRASKA.

LAWN-SPRINKLER.

SPECIFICATION forming part of Letters Patent No. 464,637, dated December 8, 1891.

Application filed May 23, 1891. Serial No. 393,877. (No model.)

*To all whom it may concern:*

Be it known that I, ROBERT SERVETUS MOORE, a citizen of the United States, residing at Bradshaw, in the county of York and State of Nebraska, have invented a new and useful Lawn-Sprinkler, of which the following is a specification.

This invention relates to that class of lawn-sprinklers in which the discharge-pipe is provided with a revolving head having curved discharge arms or nozzles, to which a rotary motion is imparted automatically by the discharge of the water.

The invention has for its object to provide sprinklers of this class with an attachment by means of which the supply of water may be cut off automatically at a given time, which may be conveniently regulated.

The invention consists in the improved construction, arrangement, and combination of parts, which will be hereinafter fully described, and particularly pointed out in the claims.

Figure 3:
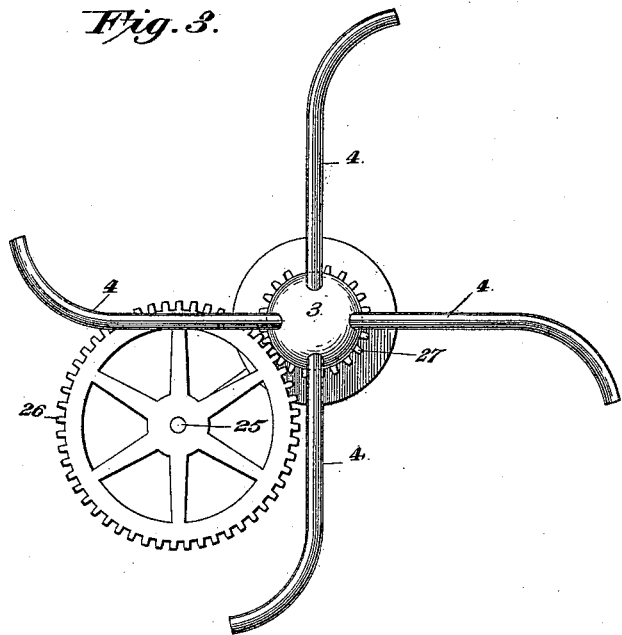
Figure 4:
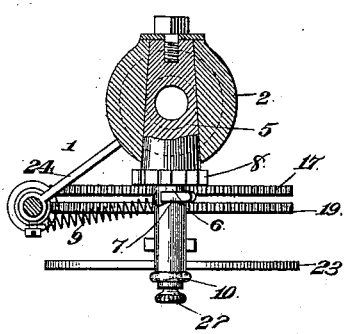

In the drawings hereto annexed, Figure 1 is a side elevation of a device constructed in accordance with my invention. Fig. 2 is a vertical sectional view of the same. Fig. 3 is a plan view. Fig. 4 is a horizontal sectional view taken through the valve.

Like numerals of reference indicate like parts in all the figures.

1 designates a frame, through which extends the vertical supply-tube 2, which is provided at its upper end with a swiveled head 3, having curved discharge arms or nozzles 4. The tube 2 is provided with a valve 5, the stem 6 of which extends through the front of the casing and is provided with an arm or crank 7 and with a ratchet-wheel 8. A suitably-arranged spring 9, one end of which is connected with the crank 7, serves to hold the valve normally in a closed position.

10 designates a lever, which is suitably pivoted to the casing and the upper end of which constitutes a dog or pawl adapted to engage the ratchet-wheel 8 for the purpose of holding the valve open for the passage of water.

A frame or box 11, which is secured to the front side of the casing, is provided with shafts designated, respectively, by 12, 13, and 14. The lower shaft 12 carries a spur-wheel 15 and a pinion 16, the latter meshing with a spur-wheel 17 upon the shaft 13. The latter also carries a pinion 18, meshing with a spur-wheel 19 upon the shaft 14, to which motion at a reduced rate of speed is thus transmitted. The front end of the shaft 14 extends through the frame 11 and is provided with a flange or shoulder 20 to support a hand or pointer 21, which is secured adjustably by means of a nut 22 upon the screw-threaded outer end of the shaft 14. The shaft 14 extends through a disk or dial 23, which is secured upon the front side of the frame 11, and the face of which is marked to indicate divisions of time.

The frame or casing of the device is provided with laterally-extending arms or brackets 24, having bearings for a vertical shaft 25, the upper end of which has a pinion 26 meshing with a pinion 27, which is secured to and adapted to revolve with the revolving head 3 of the discharge-pipe. The lower end of the shaft 25 has a spiral thread or worm 28 meshing with the spur-wheel 15 upon the shaft 12, to which rotary motion may thus be imparted.

The operation of this invention will be readily understood from the foregoing description, taken in connection with the drawings hereto annexed. In escaping through the discharge-nozzles the water imparts a rotary motion to the swiveled head 3, the pinion 27 of which, meshing with pinion 26, rotates the shaft 25, thus transmitting through the worm 28 a slow rotary motion to the spur-wheel 15. Motion at a further reduced rate of speed is transmitted from the spur-wheel 15 through the train of gears to the shaft 14, carrying the hand 21. The average water-pressure being known, the device may be easily constructed so as to cause the shaft 14 to revolve once in a given space of time—say two hours—and the face of the dial 23 will accordingly be marked to indicate the divisions of the time occupied by the shaft 14 in making a single revolution. The exact time occupied by the shaft in making a single revolution may vary somewhat with varying pressures of the water, but may be determined nearly enough for all practical purposes.

To "set" the device for operation the valve is opened to any desired extent and held in an open position by the upper end of the lever 10, engaging the ratchet-wheel 8 upon the valve-stem, the lower end of said lever lying in the path of the hand 21 upon the revolving shaft 14. The said hand is then set by loosening the nut 22 sufficiently to enable it to be turned to any desired position with relation to the lower end of the lever 10, thus determining the time which the device shall be permitted to operate before the said hand 21 shall engage the lower end of the lever 10 and turn the latter upon its pivot so as to disengage its upper end from the ratchet-wheel 8, when the valve will be instantly closed by the action of the spring 9.

Water-supply companies almost invariably prescribe rules limiting the hours during which sprinkling of lawns is permissible. It is not always convenient to turn off the water at the exact hour required, and the owners of lawn-sprinklers, violating the rules, often lay themselves liable to fines on this account. By my improved attachment, which is exceedingly simple and automatic in its operation, the lawn-sprinkler may readily be set to run any desired length of time, at the expiration of which the water-supply is cut off automatically, thus saving time, trouble, and annoyance.

Having thus described my invention, what I claim is—

1. The combination, with a tube, a sprinkler swiveled on the end of the tube and revolved by the flow of water therethrough, and a valve in the tube, of mechanism, substantially as described, driven by said sprinkler for operating said valve to cut off the flow of water.

2. The combination, with a tube, a sprinkler swiveled on the end of the tube and revolved by the flow of water therethrough, and a valve in the tube, of mechanism, substantially as described, for operating said valve to cut off the flow of water, a pinion on the sprinkler, a shaft having a pinion meshing therewith, and a worm on the shaft driving a spur-wheel of said mechanism.

3. The combination, with a tube having a valve, and mechanism, substantially as described, for operating said valve, of a revolving sprinkler, a pinion on the sprinkler, a shaft having a pinion meshing therewith, and a worm on the shaft driving a spur-wheel of said mechanism.

4. The combination, with a revolving sprinkler, of a valve regulating the water-supply, a spring to hold the said valve normally in a closed position, means for holding said valve open against the tension of the spring, and mechanism actuated by the revolving head of the sprinkler for releasing said holding mechanism, substantially as set forth.

5. The combination, with a revolving sprinkler, of a valve regulating the water-supply, a spring to hold said valve normally closed, a ratchet-wheel mounted upon the valve-stem, a lever or pawl adapted to engage said ratchet-wheel, a revoluble shaft having an adjustable hand adapted to engage the opposite end of said pawl or lever, and means for transmitting motion to the said shaft from the revolving head of the sprinkler, substantially as and for the purpose set forth.

6. The combination, with a revolving sprinkler, of a valve regulating the water-supply, a spring to hold said valve normally closed, a ratchet-wheel mounted upon the valve-stem, a lever or pawl adapted to engage said ratchet-wheel, a revoluble shaft having an adjustable hand adapted to engage said pawl or lever, stationary dial having its face marked to indicate divisions of time, and means for transmitting motion from the revoluble head of the sprinkler to the shaft carrying the adjustable hand, substantially as set forth.

7. The combination of the casing, the supply-pipe extending through the same and having a revolving sprinkler-head, a valve located in the supply-pipe, a spring to hold said valve normally closed, a ratchet-wheel mounted upon the valve-spring, a lever or pawl adapted to engage said ratchet-wheel, a revolving shaft having an adjustable hand adapted to engage said pawl or lever, a shaft having at one end a pinion meshing with a pinion upon the revolving sprinkler-head and at its opposite end a spiral thread or worm, and a train of gears to transmit motion at a reduced rate of speed from said worm to the shaft carrying the adjustable hand, substantially as and for the purpose herein set forth.

In testimony that I claim the foregoing as my own I have hereto affixed my signature in presence of two witnesses.

ROBERT SERVETUS MOORE.

Witnesses:
FRANK C. WALROD,
SAMUEL A. MORRISON.